L. E. ROBINSON.
AUTO BRACE.
APPLICATION FILED FEB. 19, 1915.
1,173,386. Patented Feb. 29, 1916.
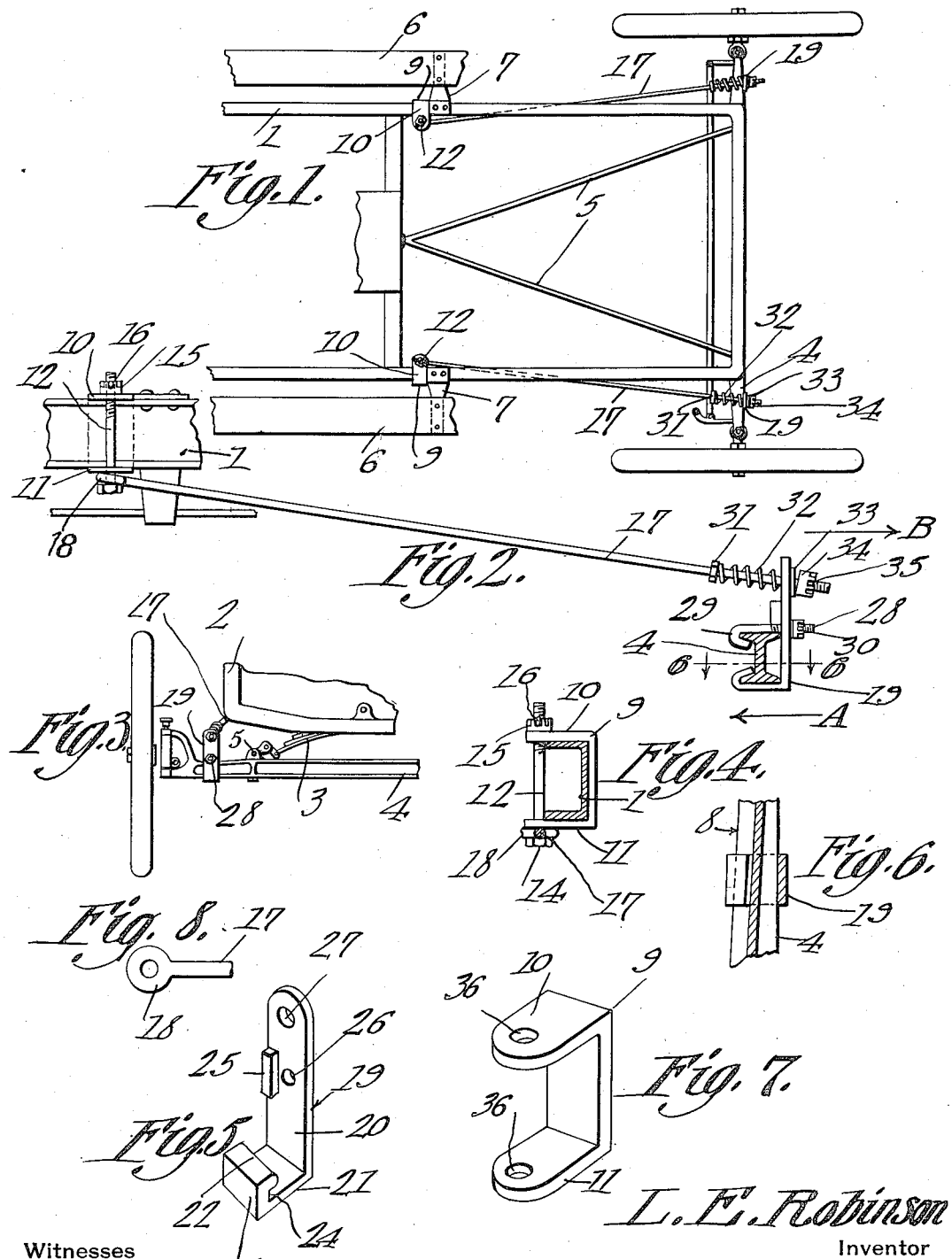

UNITED STATES PATENT OFFICE.

LAWRENCE E. ROBINSON, OF COFFEYVILLE, KANSAS.

AUTO-BRACE.

1,173,386. Specification of Letters Patent. Patented Feb. 29, 1916.

Application filed February 19, 1915. Serial No. 9,327.

*To all whom it may concern:*

Be it known that I, LAWRENCE E. ROBINSON, a citizen of the United States, residing at Coffeyville, in the county of Montgomery and State of Kansas, have invented a new and useful Auto-Brace, of which the following is a specification.

The device forming the subject matter of this application is a reinforcement for the radius rods of Ford automobiles.

The invention aims to provide a novel means whereby when the radius rods are strained beyond their limit of resistance, and when the front axle tends to swing rearwardly, such rearward movement will be prevented.

The invention aims to provide a means for accomplishing the above result in which a pair of rods or ties are subjected to tension to resist the rearward swinging of the axle, a buckling of the rods being impossible, owing to the fact that they act by tension to resist the rearward swinging movement of the axle.

A further object of the invention is to provide novel means for assembling the forward ends of the reinforcing rods or ties with the axle; and a further object of the invention is to provide novel means for assembling the rear ends of the reinforcing rods with the frame.

It is within the scope of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows in top plan, a portion of a Ford automobile wherewith the device forming the subject matter of this application has been assembled; Fig. 2 is a vertical longitudinal section showing in elevation the reinforcement forming the subject matter of this application; Fig. 3 is a fragmental front elevation of a motor vehicle embodying the present invention; Fig. 4 is a transverse section taken through a portion of the vehicle frame and showing the means whereby the rear ends of the reinforcing rods are assembled with the frame; Fig. 5 is a perspective view delineating the standard whereby the forward ends of the reinforcing rods are connected to the front axle; Fig. 6 is a fragmental horizontal section on the line 6—6 of Fig. 2; Fig. 7 is a perspective depicting one of the brackets whereby the rear ends of the reinforcing rods are connected with the vehicle frame; Fig. 8 is a fragmental plan showing a portion of one of the reinforcing rods.

In the drawings, the numeral 1 indicates the chassis or frame of a motor propelled vehicle, preferably but not necessarily a Ford automobile. The body of the vehicle is shown in part at 2. The springs of the vehicle are shown at 3 and the numeral 4 designates the front axle. The radius rods appear at 5 and the running boards are shown at 6, the latter elements being upheld by means of brackets 7 secured to the chassis or frame 1. The axle 4 ordinarily tapers toward its ends as shown at 8.

Applied to the chassis or frame 1 at the sides thereof are brackets 9 each bracket 9 embodying an upper arm 10 and a lower arm 11. The arms 10 and 11 are equipped with openings 36 through which passes a bolt 12, the head of which is denoted by the numeral 14. Applied to the upper end of the bolt 12 and bearing upon the upper arm 10 of the bracket 9 is a nut 15 which may be held in place by means of a cotter pin 16.

The invention embodies a pair of rearwardly extended, converging ties in the form of rods 17, provided at their rear ends with eyes 18 embracing the lower ends of the bolts 12 and lying between the lower arms 11 of the brackets 9 and the heads 14 of the bolts.

For the purpose of securing the rods 17 at their forward ends movably to the front axle 4 there is provided a pair of standards 19 one of which is shown in detail in Fig. 5. Each standard 19 comprises an upright arm 20 which lies against the forward edge of the axle 4, a base 21 extended rearwardly beneath the axle, the base 21 being provided with an upstanding rib 23 which engages the rear edge of the axle, the rib 23 terminating in an overhanging lip 22 which engages the upper edge of the lower flange of the axle, the arm 20 being provided with a rearwardly extended lug 25 which engages the upper edge of the axle 4 near to the front thereof, to hold the standard 19 against downward movement, and the arm 19 being provided with an opening 26 through which passes a bolt 28, the bolt having at its rear end a hook 29 which engages around the rear edge of the upper flange of the axle, an abutment in the form of a nut 34 being applied to the forward end of the rod, the nut 34 being held in place by a cotter pin 35 or the like. The rear rib 23 of the standard 19 is disposed at an acute angle to the arm 20, the rib 23 and the lip 22 defining a tapered socket 24 which is wedged onto the tapered end 8 of the axle 4, it being obvious when the nature of the invention is better understood that when the rods 17 are under tension, the tendency of these rods is to wedge the sockets 24 onto the tapered ends 8 of the axle 4.

Mounted on each rod 17 to the rear of the arm 20 of the standard 19 is an abutment 31. Surrounding each rod 17 and interposed between the abutment 31 and the rear face of the arm 20 of the standard 19 is a helical compression spring 32. The forward end of each rod 17 passes through an opening 27 formed in the arm 20 of the standard 19 near to the top thereof and, if desired, a washer 33 may be interposed between the nut 34 and the forward face of the arm 20 of the standard 19.

Let it be supposed that the parts are arranged as shown most clearly in Fig. 2 of the drawings. Then, as the vehicle body 2 moves upon the springs 3, the rods 17 reciprocate in the direction of their lengths in the openings 27 of the arms 20 of the brackets 19. The springs 32 under such circumstances tend to prevent the rods 17 from rattling.

If the radius rods 5 yield, then the lower edge of the axle 4 tends to swing rearwardly, in the direction of the arrow A of Fig. 2. Noting that the arm 20 of the standard 19 upstands above the axle 4, the upper end of the arm under such circumstances tends to swing forwardly in the direction of the arrow B. By this operation, the rods 17 are put under tension and hold the axle securely in place. Especial attention is directed to the fact that owing to the construction above outlined, the rods 17 exercise their functions when subjected to tension, as distinguished from compression. Consequently, a comparatively light rod may be employed at 17 and there will be no danger of the rod buckling.

It is to be observed that the brackets 7 exercise a double function. First, since they are located immediately in front of the brackets 9, the last specified brackets are prevented from sliding forwardly on the side portions of the frame 1. Further, the brackets 7 serve to uphold the running boards 6. Thus, in order to secure the brackets 9 against forward movement, no additional elements need be applied to the side portions of the frame 1, the running board brackets 7 being made efficient for the purposes above outlined.

Having thus described the invention, what is claimed is:—

1. In a radius rod reinforcement for motor vehicles, a frame; an axle carried thereby; radius rods attached to the frame; standards carried by the axle and upstanding above the axle; longitudinally inextensible tie members attached at their rear ends to the frame; means for securing the forward ends of the radius rods to the axle above the longitudinal center of the axle; and means for securing the forward ends of the tie members to the standards at points above the axle whereby when the axle swings rearwardly, the tie members will act under tension to reinforce the radius rods and to prevent a buckling thereof.

2. In a radius rod reinforcement for motor vehicles, the combination with a frame, a tapered axle, and radius rods connecting the frame and the axle of standards embodying tapered sockets receiving the tapered axle, the standards upstanding above the axle; tie members; means for securing the tie members to the frame; and means for attaching the forward ends of the tie members to the standards above the axle, whereby when the axle swings rearwardly, the tie members will act under tension to reinforce the radius rods, the tie members constituting means for wedging the tapered sockets upon the tapered axle.

3. In a radius rod reinforcement for motor vehicles, a frame; an axle; radius rods connecting the frame and the axle; tie members; means for securing the tie members to the frame; standards secured to the axle and upstanding above the axle, the standards receiving the forward ends of the tie members slidably; abutments on the tie members and coacting with the forward faces of the standards to render the tie members effective under tension as a means for reinforcing the radius rods; springs exerting a thrust against the rear faces of the standards; and abutments on the tie members, the said abutments coacting with the springs.

4. In a radius rod reinforcement for motor vehicles, a frame; an axle; standards abutting against the forward edge of the axle and provided at their lower ends with hook-shaped elements engaged around the lower edge of the axle, each standard being provided with a rearwardly extended lug engaging the upper edge of the axle; a hook-bolt extended through the standard and engaging the upper edge of the axle; rods mounted to slide in the standards above the axle; an abutment on each rod and coacting with the forward face of the standard; an abutment on each rod to the rear of the standard; compression springs interposed between the last specified abutments and the rear faces of the standards; and means for securing the rear ends of the rods to the frame.

In testimony that I claim the foregoing as my own, I have hereto affixed my signature in the presence of two witnesses.

LAWRENCE E. ROBINSON.

Witnesses:
F. E. GARVERICK,
V. M. CAHILL.